United States Patent  [11] 3,628,633

| [72] | Inventor | Albert D. Meeks<br>McLean, Va. |
| --- | --- | --- |
| [21] | Appl. No. | 14,149 |
| [22] | Filed | Feb. 25, 1970 |
| [45] | Patented | Dec. 21, 1971 |
| [73] | Assignee | The United States of America as represented by the Secretary of the Army |

[54] LINEAR AND ANGULAR VELOCITY BRAKE
10 Claims, 1 Drawing Fig.

[52] U.S. Cl. ..................................................... 188/1 C, 188/129
[51] Int. Cl. ....................................................... F16f 7/12
[50] Field of Search ............................................ 188/1 B, 1 C, 129; 293/70, 71 R

[56] References Cited
UNITED STATES PATENTS

| 2,819,060 | 7/1958 | Neidhart | 188/129 UX |
| --- | --- | --- | --- |
| 2,819,063 | 7/1958 | Neidhart | 188/129 UX |

FOREIGN PATENTS

| 1,105,404 | 6/1955 | France | 188/1 C |

*Primary Examiner*—Duane A. Reger
*Attorneys*—Harry M Saragovitz, Edward J. Kelly, Herbert Berl and J. D. Edgerton ABSTRACT: A unidirectional braking device comprising a pliable member which is located partially in the path of a moving object for providing the retarding force to the object and a support member to substantially prevent the pliable member from yielding in the forward direction and to permit substantial yielding of the pliable member in the reverse direction. The pliable member comprises a material which is yieldable under the force created by the transmission of the object and braking is accomplished by means of friction between the pliable member and the object. In order to achieve directionality of braking, a nonyielding support member is located to the forward side of the pliable member and is coextensive with the pliable member but recessed from the path of the object. A more gradual braking effect can be achieved with the use of a plurality of pliable members spaced apart by support members, the entire unit being rigidly held together. Each of the support members are coextensive with the pliable members at the forward side of each of the pliable members. A space is provided at the reverse side between each of the support members and the pliable members to permit the pliable members to yield in the reverse direction. This space comprises a recess located at each of the support members. Angular and linear retarding forces to spinning cylindrical projectiles may be achieved by the use of a cylindrical brake.

PATENTED DEC 21 1971 3,628,633
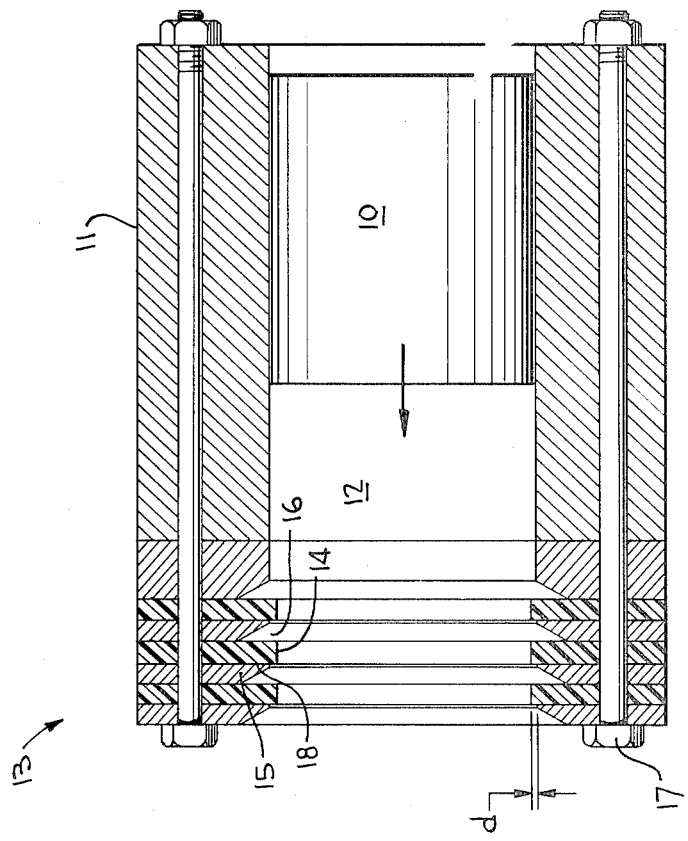
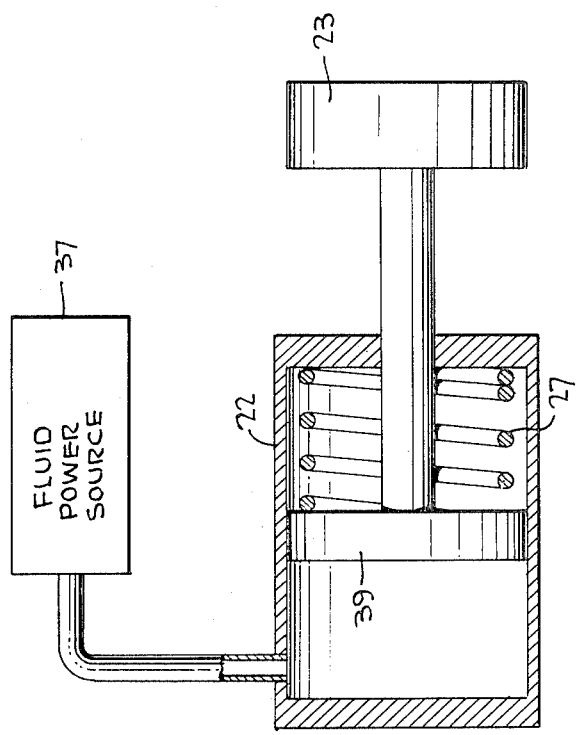
INVENTOR,
ALBERT D. MEEKS
BY Harry M. Saragovitz
Edward J. Kelly
Herbert Berl
J. D. Edgerton
ATTORNEYS 3,628,633

LINEAR AND ANGULAR VELOCITY BRAKE

RIGHTS OF THE GOVERNMENT

The invention described herein may be manufactured, used, and licensed by or for the United States Government for governmental purposes without the payment to me of any royalty thereon.

BACKGROUND OF THE INVENTION

This invention relates to the apparatus for providing shock absorbing and braking, and more particularly for an improved unidirectional braking device for projectiles and the like.

In certain applications it is desirable to provide a braking device which applies greater retarding forces to objects traveling in a forward direction then in a reverse direction. One requiring such a brake is disclosed in the copending application of Curchack, entitled "Dynamic Tester for Projectile Components" Ser. No. 7,929, filed Feb. 2, 1970.

The invention disclosed in the Curchack application relates to a projectile which is caused to impact against a reusable hydraulic mitigator, thereby causing the mitigator to be transmitted in a forward direction into a catch tube. In order to preserve the mitigator and to prevent undue shock to its components it is desirable to provide a braking force. However, it is also necessary to reinstate the mitigator in its initial starting position by transporting it back through the catch tube in the reverse direction. Accordingly the braking device on the mitigator should be of a unidirectional nature, that is, braking should be applied only in the forward direction and not in the reverse direction.

It is therefore a primary object of this invention to provide a unidirectional braking device for applying a greater retarding force to objects traveling in a forward direction than in a reverse direction.

Another object of this invention is to provide a unidirectional braking device which applies greater frictional retarding forces in a forward direction than in a reverse direction.

A further object of the invention is to provide angular and linear retarding forces for cylindrical projectiles which are rotating.

Yet another object of the invention is to provide means for returning an object through the brake after it has partially penetrated the brake.

SUMMARY OF THE INVENTION

Briefly in accordance with this invention, the unidirectional braking device comprises a pliable member which is located partially in the path of a moving object for providing the retarding force to the object and a support member to substantially prevent the pliable member from yielding in the forward direction and to permit substantial yielding of the pliable member in the reverse direction. The pliable member comprises a material which is yieldable under the force created by the transmission of the object and braking is accomplished by means of friction between the pliable member and the object. In order to achieve directionality of braking, a nonyielding support member is located to the forward side of the pliable member and is coextensive with the pliable member but recessed from the path of the object. A more gradual braking effect can be achieved with the use of a plurality of pliable members spaced apart by support members, the entire unit being rigidly held together. Each of the support members are coextensive with the pliable members at the forward side of each of the pliable members. A space is provided at the reverse side between each of the support members and the pliable members to permit the pliable members to yield in the reverse direction. This space comprises a recess located at each of the support members. Angular and linear retarding forces to spinning cylindrical projectiles may be achieved by the use of a cylindrical brake.

BRIEF DESCRIPTION OF THE DRAWINGS

The specific nature of the invention as well as other objects, aspects, uses, and advantages thereof will appear from the following description and from the accompanying drawings, in which:

The FIGURE is a front sectional view of one embodiment of the present invention.

DESCRIPTION OF THE PREFERRED EMBODIMENT

Referring now to the FIGURE, an object 10 is shown travelling in the forward direction, as indicated by the arrow, within a bore 12 of guide tube 11. The unidirectional braking system of this invention is shown generally at 13 and comprises one or more pliable members 14 which are located partially in the path of object 10. Each pliable member 14, can be made of any suitable material which is flexible and capable of applying frictional retarding forces to object 10. Rubber or synthetic plastics may be used for this purpose.

Each of the pliable members 14 is separated by a structurally rigid member 15, made of metal or the like, and the entire unit is held together by suitable securing means 17. The rigid members 15 are coextensive with the pliable members 14 at the forward side 18 of each of the pliable members and a recess of a distance "$d$" is provided to enable object 10 to clear the rigid members 15. A suitable space 16 is provided at the reverse side of each of the pliable members 14 in order to enable the pliable members to yield in the reverse direction under the force created when object 10 is transmitted in the reverse direction.

In operation, object 10 enters brake system 13 and comes in contact with the top portions of each of the pliable members 14. The friction created between members 14 and object 10 causes a relatively large retarding force on the object, thereby tending to reduce the velocity of the object. Because rigid members 15 are coextensive with pliable members 14 at the forward side 18, the pliable members are not permitted to yield in the forward direction, thereby producing a braking effect. The object 10 will normally come to rest after having penetrated part of brake 13. Should object 10 penetrate all of brake 13 it will come to rest against pistonhead 23.

Should it now be desired to replace object 10 to its initial starting position, pistonhead 23 would be activated, in a manner to be hereinafter described, in order to push object 10 back through brake 13 in the reverse direction. As pressure is applied to object 10 in the reverse direction, frictional forces between object 10 and pliable members 14 will tend to apply forces to each of the pliable members 14 in the reverse direction. Because space 16 is provided at the reverse side of each of the pliable members, the pliable members will yield in the reverse direction, thereby providing adequate clearance for object 10 to be transmitted in that direction. Accordingly, it will be appreciated that the retarding forces acting on object 10 in the reverse direction will be significantly less than those retarding forces acting on object 10 in the forward direction.

Movable pistonhead 23 is activated by a suitable power source 37, which may be hydraulic or pneumatic, to displace piston 39 within housing 22. Springs 27 are simply provided to return piston 39 to its start position upon the removal of fluid power from source 37.

In certain applications, such as that disclosed in the previously mentioned copending Curchack application, the object 10 may be spinning at a rapid rate while traveling in the forward direction. Should it be desirable to reduce the angular as well as the linear velocity of object 10, brake system 13 may be cylindrical in shape to completely surround a cylindrical object. The actual magnitude of retarding forces applied to object 10 in both the forward and reverse directions is merely a matter of ordinary design and depends upon such factors as the material used for pliable members 14, the total number of such members, the size of spaces 16 as well as other factors which would be evident to persons skilled in the art.

It will be appreciated that while I have described my invention with respect to a specific embodiment, I do not desire to be limited to the exact details of construction shown and described, for obvious modifications will occur to persons skilled in the art.

I claim as my invention:

1. A unidirectional braking apparatus for providing a greater retarding force to a projectile moving in a forward direction than in a reverse direction comprising at least one pliable member located partially in the path of a moving cylindrical projectile for providing a frictional retarding force to said projectile, said pliable member comprising at least one interference member of pliable sheet material having a cylindrical aperture, said aperture having a diameter smaller than the diameter of the cross section of said projectile, and at least one support member to substantially prevent said pliable member from yielding in said forward direction and to permit yielding in said reverse direction, said support member comprising at least one member of rigid sheet material having a conical aperture, whereby a greater retarding force is applied to a projectile transmitter in a forward direction than in a reverse direction.

2. The braking apparatus of claim 1 wherein said support member is coextensive with said pliable member and is recessed from the path of said projectile.

3. The braking apparatus of claim 2 further comprising a plurality of pliable members each spaced apart by a support member, said pliable members and said support members being rigidly held together.

4. The braking apparatus of claim 3 further comprising a space located between each of said support members and the reverse side of each of said pliable members, said space being provided by a conical aperture in each of said support members, to permit said pliable members to yield in the reverse direction.

5. The braking apparatus of claim 4 wherein the portion of said pliable members extending into the path of the projectile provide angular and linear retarding forces.

6. The braking apparatus of claim 1 wherein said pliable members and said support members are alternately and coaxially appositioned, first member being a support member, said apparatus being coaxially attached at the fore end of a bore.

7. The braking apparatus of claim 6 further comprising means for returning through said apparatus a projectile which has partially penetrated said apparatus, last-named means further comprising means for applying a reverse force sufficient to dislodge and return through said bore said projectile lodged in said apparatus.

8. The braking apparatus of claim 6 wherein the aperture in said support member has a diameter greater than the diameter of the cross section of said projectile.

9. The braking apparatus of claim 8 wherein the aperture in said support member has an obtuse edge in the forward direction with respect to the primary motion of said projectile and an acute edge in the reverse direction with respect to the primary motion of said projectile.

10. The apparatus of claim 9 wherein a portion of said pliable member interferes with the motion of said projectile, said interference portion providing a greater decelerating force on the projectile when moving in said apparatus in the forward direction than when said projectile is returned through said apparatus in the reverse direction, said projectile first being thrust through said bore and into said braking apparatus and then returned by imparting a reversed lesser force upon said projectile.

* * * * *